(12) United States Patent
Bour

(10) Patent No.: US 6,920,929 B2
(45) Date of Patent: Jul. 26, 2005

(54) REVERSE CIRCULATION CEMENTING SYSTEM AND METHOD

(75) Inventor: Daniel L. Bour, Bakersfield, CA (US)

(73) Assignee: Halliburton Energy Services, Inc., Duncan, OK (US)

( * ) Notice: Subject to any disclaimer, the term of this patent is extended or adjusted under 35 U.S.C. 154(b) by 150 days.

(21) Appl. No.: 10/386,854

(22) Filed: Mar. 12, 2003

(65) Prior Publication Data

US 2004/0177962 A1 Sep. 16, 2004

(51) Int. Cl.[7] ............................................. E21B 33/13
(52) U.S. Cl. ......................................................... 166/292
(58) Field of Search ................................. 166/285, 291, 166/292

(56) References Cited

U.S. PATENT DOCUMENTS

| | | | | |
|---|---|---|---|---|
| 975,065 | A | * 11/1910 | Pedder | 166/285 |
| 3,299,953 | A | * 1/1967 | Bernard | 166/285 |
| 3,412,795 | A | * 11/1968 | Terry | 166/285 |
| 4,300,633 | A | 11/1981 | Stewart | 166/250 |
| 4,531,583 | A | 7/1985 | Revett | 166/253 |
| 4,548,271 | A | 10/1985 | Keller | 166/285 |
| 5,133,409 | A | 7/1992 | Bour et al. | 166/293 |
| 5,147,565 | A | 9/1992 | Bour et al. | 252/8.551 |
| 5,188,176 | A | 2/1993 | Carpenter | 166/285 |
| 5,494,107 | A | 2/1996 | Bode | 166/285 |
| 5,762,139 | A | 6/1998 | Sullaway et al. | 166/291 |
| 5,890,538 | A | * 4/1999 | Beirute et al. | 166/285 |
| 5,897,699 | A | 4/1999 | Chatterji et al. | 106/678 |
| 6,063,738 | A | 5/2000 | Chatterji et al. | 507/269 |
| 6,196,311 | B1 | 3/2001 | Treece et al. | 166/192 |
| 6,223,823 | B1 | * 5/2001 | Head | 166/290 |
| 6,244,342 | B1 | 6/2001 | Sullaway et al. | 166/285 |
| 6,367,550 | B1 | 4/2002 | Chatterji et al. | 166/293 |
| 2004/0084182 | A1 | * 5/2004 | Edgar et al. | 166/285 |

FOREIGN PATENT DOCUMENTS

| | | | |
|---|---|---|---|
| RU | 1 542 143 C | 12/1994 | E21B/47/00 |
| RU | 2 086 752 C1 | 8/1997 | E21B/33/14 |
| SU | 1420139 A1 | 8/1988 | E21B/33/14 |
| SU | 1758211 A1 | 8/1992 | E21B/33/14 |

OTHER PUBLICATIONS

"Halliburton Sets World Record on Reverse Circulated Foam Cement Job in Wyoming", Mar. 19, 2000, Halliburton.*

Perdue, Jeanne M., Silverman, Seth A., "March: Drilling and Production Yearbook: 2000 World Records and Firsts", Mar. 2000, Hart's E & P.*

Abstract No. XP–002283587 entitled "Casing String Reverse Cemented Unit Enhance Efficiency Hollow Pusher Housing."

Abstract No. XP–002283586 entitled "Reverse Cemented Casing String Reduce Effect Intermediate Layer Mix Cement Slurry Drill Mud Quality Lower Section Cement Lining."

Foreign communication from a related counterpart application dated Jun. 21, 2004.

Halliburton Casing Sales Manual, Section 4, Cementing Plugs, pp. 4–29 And 4–30, dated Oct. 6, 1993.

* cited by examiner

Primary Examiner—David Bagnell
Assistant Examiner—Daniel P Stephenson
(74) Attorney, Agent, or Firm—Craig W. Roddy; Haynes and Boone, LLP

(57) ABSTRACT

A system and method of cementing in an annulus formed between a casing and the wall of a well bore, wherein a foamed cement is introduced into the upper portion of the annulus, directed downwardly through the annulus and back up into the casing, and then displaced back down the casing and into the annulus.

9 Claims, 2 Drawing Sheets

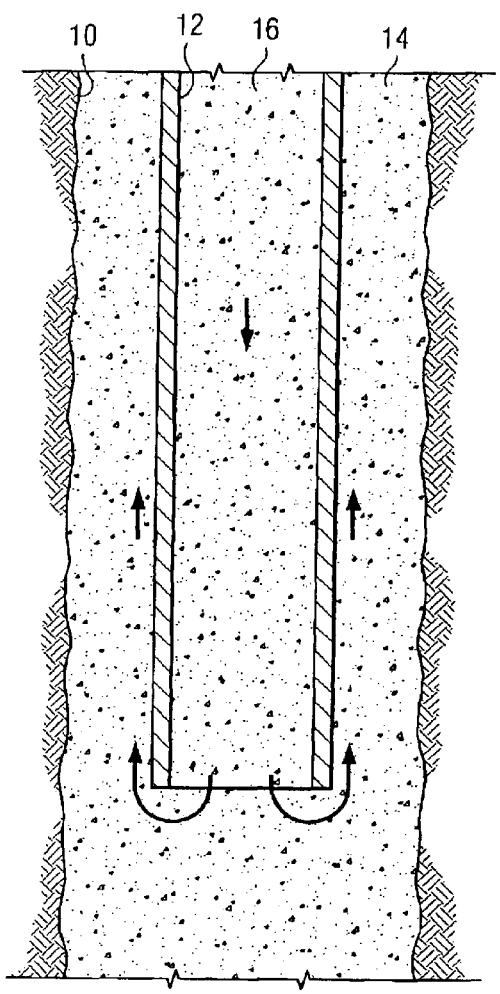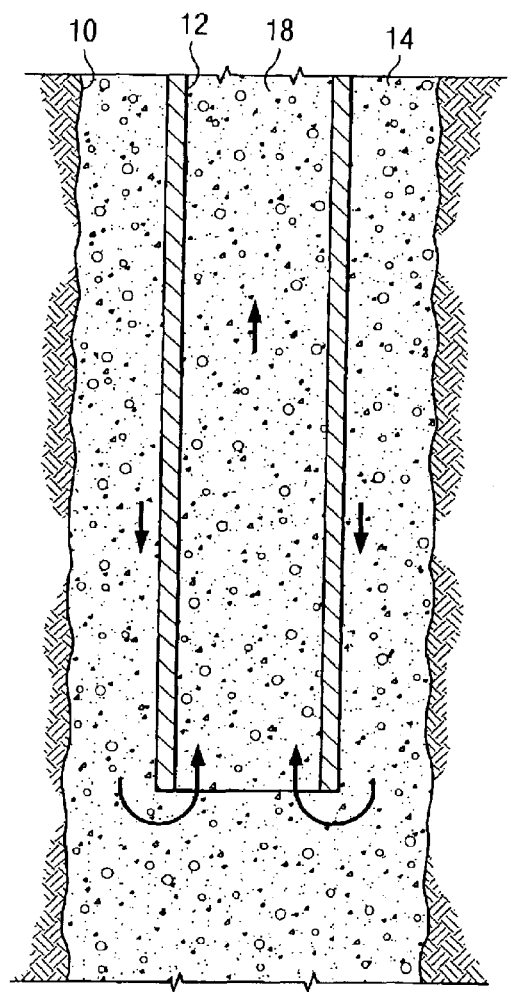
FIG. 1
(PRIOR ART)
FIG. 2

US 6,920,929 B2

REVERSE CIRCULATION CEMENTING SYSTEM AND METHOD

BACKGROUND

In oil field recovery operations, a casing, in the form of a steel pipe, or the like, is often placed in an oil and gas well to stabilize the well bore. In these installations, a cement sheath is formed in the annulus between the casing and the wall of the well bore to support the casing, to prevent migration of fluids in the annulus, and to protect the casing from corrosive formation fluids.

In accordance with conventional cementing operations, the sheath is formed by introducing a cement slurry into the upper end portion of the casing at the ground surface and allowing the cement to flow through the casing to the bottom of the well and reverse direction into the annulus. The cement then flows into and through the annulus between the casing and the wall forming the well, and circulates back to the ground surface. The flow of cement is then terminated and the cement allowed to set to form the sheath.

Numerous challenges can be present in these types of cementing operations. For example, it is often difficult to obtain the proper circulation of cement inside the annulus due to a weak formation around the well. Also, the hydrostatic weight of the cement exerts significant pressure against the formation, especially when additional pressure is applied to the formation due to the friction of the cement slurry that must be overcome.

One technique utilized to overcome these deficiencies and reduce the formation pressure employs reverse circulation in which the cement slurry is pumped down the annulus and back up the casing. While this greatly reduces the total pressure applied to the formation, it has several drawbacks. For example, it is impossible for the operator to determine exactly when the cement completely fills the annulus without the use of some type of tool which is expensive and time consuming. Thus, the operator runs the risk of either not completely filling the annulus with the cement or of filling the cement back up inside the casing string, thus covering potential productive areas and/or requiring additional time and expense to drill out this cement.

Another challenge to reverse circulation is that the heavier cement tends to flow inside the casing due to "U-Tubing." Since typical float equipment used to prevent this cannot be used in reverse circulations, pressure must be held on the annulus until the cement has sufficiently set to prevent the U-Tubing. This can cause a micro-annulus to form between the cement sheath and casing. A micro-annulus can make it difficult to bond log the casing to evaluate the quality of the cementing operation and determine if the annulus is properly sealed. A micro-annulus can also allow unwanted flow of gas, brine, etc., behind the casing.

Still further, since the cement will not vary much in density throughout the height of the well bore, the benefit of reverse circulating a conventional cement is minimal since the total hydrostatic pressure of the cement column acts on the formation at the end of the operation.

Therefore, what is needed is a system and method that eliminates the problems with conventional circulation, yet avoids the problems associated with reverse circulation.

BRIEF DESCRIPTION OF THE DRAWINGS

FIG. 1 is a sectional/schematic view of an oil and gas recovery well employing a conventional circulation system and method according to the prior art.

FIG. 2 is a sectional/schematic view of an oil and gas recovery well employing a reverse circulation system according to an embodiment of the invention.

DETAILED DESCRIPTION

Figure 3:
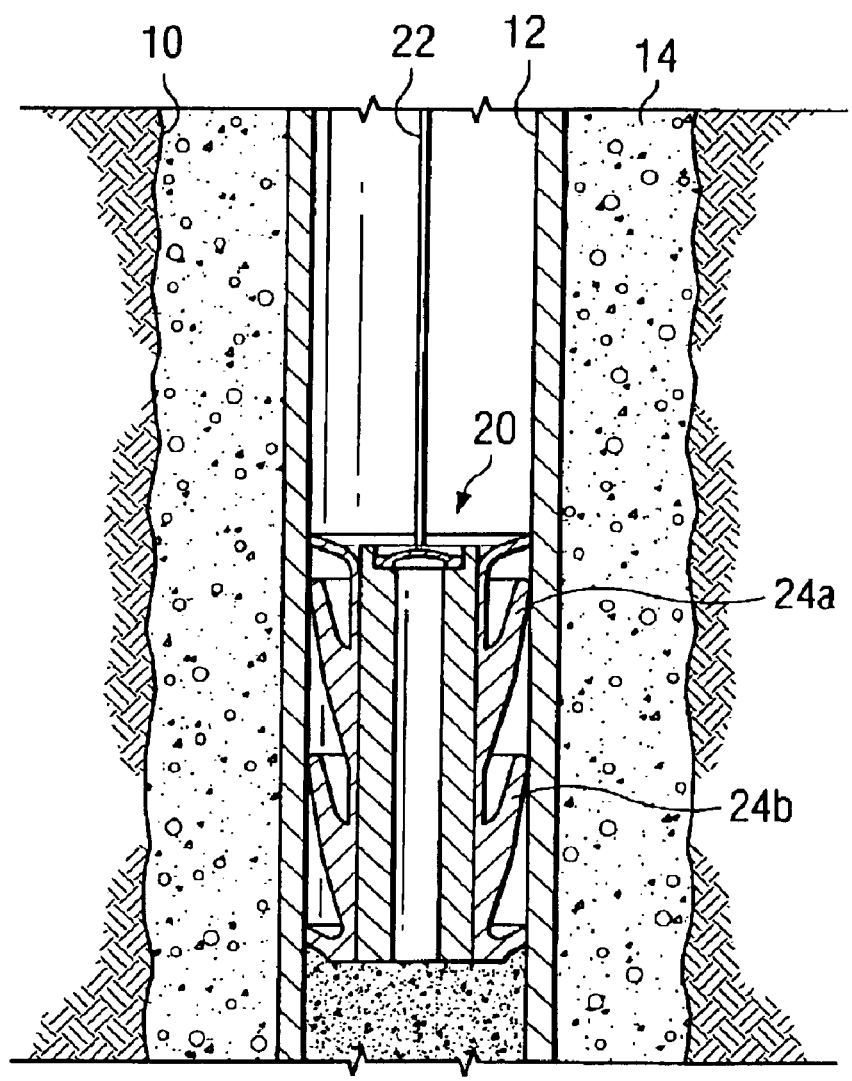
FIG. 3 is a view, similar to FIG. 2, depicting a forcing and wiping technique utilized in the embodiment of FIG. 2.

Referring to FIG. 1, the reference numeral 10 refers to an underground, substantially vertically-extending, well bore. A casing 12 extends from the ground surface (not shown) into the well bore 10 and terminates at a predetermined depth in the well bore 10. The outer wall of the casing 12 is slightly spaced from the inner wall of the well bore 10 to form an annulus 14.

In order to prevent migration of fluids in the annulus 14, to support the casing 12 or liner string, and to protect of the casing 12 from corrosive formation fluids, a cement sheath is formed in the annulus 14. To form a sheath in accordance with most conventional, prior-art methods, a fluid cement 16 is introduced from a source at the ground surface into the upper end of the casing 12 and flows downwardly through the bottom end of the casing 12 as shown in FIG. 1. The fluid cement 16 then flows to the bottom of the well bore 10, or to a plug in the annulus 14 below the lower end of the casing 12, where it reverses direction and flows up the annulus 14. The flow of the fluid cement 16 is terminated and the fluid cement 16 is allowed to set, thus forming a sheath.

As indicated above, according to this conventional cementing technique, it is often difficult to obtain the proper circulation of the fluid cement 16 inside the annulus 14. Also, the hydrostatic weight of the fluid cement 16 exerts a significant pressure against the formation surrounding the well bore 10, especially when additional pressure is applied to the formation due to the friction of the cement 16 that must be overcome.

The system and method according to an embodiment of the present invention is illustrated in FIG. 2 which also operates in connection with the well bore 10, the casing 12, and the annulus 14 of FIG. 1. In particular, a foamed cement 18, which contains a compressible gas phase, is initially formed in any conventional manner and is introduced from a source at the ground surface into the upper end of the annulus 14. The foamed cement 18 thus flows downwardly through the bottom end of the annulus 14, and to the bottom of the well bore 10, or to a plug in the annulus 14 below the lower end of the casing 12. The foamed cement 18 thus reverses direction before entering the lower end of the casing 12 and flowing into the casing 12 and preferably back to the ground surface.

A preferred foamed cement 18 for use in the present invention comprises a hydraulic cement, sufficient water to form a slurry, sufficient gas to foam the slurry, and foaming additives present in an amount sufficient to facilitate the formation of the foamed cement 18. A variety of hydraulic cements can be utilized in accordance with the present invention including those comprised of calcium, aluminum, silicon, oxygen, and/or sulfur which set and harden by reaction with water. Such hydraulic cements include Portland cements, slag cements, pozzolana cements, gypsum cements, aluminous cements and silica cements. Portland cements or their equivalents are generally preferred for use in accordance with the present invention. Portland cements of the types defined and described in the API Specification For Materials And Testing For Well Cements, API Specification 10, 5th Edition, dated Jul. 1, 1990 of the American Petroleum Institute are particularly suitable. Preferred such API Portland cements include classes A, B, C, G, and H, with API classes G and H being preferred. Suitable foaming additives are described in U.S. Pat. Nos. 5,133,409; 5,147,565; 5,897,699; 6,063,738 and 6,367,550, the entire disclosures of which are incorporated herein by reference.

As shown in FIG. 3, a wiper plug 20 is then introduced into the casing 12, and is attached to a wire line, piping, or coiled tubing 22. The plug 20 can be of any known type, such as that disclosed in U.S. Pat. No. 6,196,311, which is incorporated herein by reference, assigned to the assignee of the present invention, and, includes two axially spaced wiper blades 24a and 24b extending from its outer surface that engage the inner wall of the casing 12.

The plug 20 can be forced downwardly in the casing 12 in any conventional manner, such as by the use of a displacement fluid, or the like, acting on its upper end. As the plug 20 moves down in the casing 12, it compresses the foamed cement 18 in the casing 12 and forces it back down the casing 12, while the wiper blades 24a and 24b wipe the inner wall of the casing 12. The plug 20 is shown in an intermediate position in FIG. 3 for the purposes of illustration, it being understood that it is displaced to the bottom end of the casing 12 to compress and force all of the foamed cement 18 out of the casing 12 and into the annulus 14. In this context, it is understood that a latching device, or the like (not shown), can be provided in the lower end portion of the casing 12 to latch on to the plug 20 and release the pressure on the casing 12 after the foamed cement 18 is compressed and displaced. Three and five wiper casing latchdown plugs are available from Halliburton Energy Services in Duncan, Okla. These latchdown plugs have a top portion with either three or five wipers and a lower portion with a latch-in nose to latch into a baffle installed in the casing 12. The latchdown plug, when landed and latched in its seat, can prevent backflow of the cement 18 into the casing 12.

The compression of the foamed cement 18 and the forcing of it back down the casing 12 and into the annulus 14 by the plug 20 in the above manner, results in several advantages as follows:

The density of the foamed cement 18 is relatively low as it is circulated in the above manner resulting in a relatively low pressure on the formation and relatively little increase, or a possible reduction, in the pressure in the annulus 14 throughout the entire operation. This reduces the risk of fracturing weak formations and losing foamed cement 18 into the formation.

The foamed cement 18 is of relatively good quality, and any accumulation of the foamed cement 18 above the desired depth inside the casing 12 is eliminated. As a result, no additional rig time is needed to drill out unwanted foamed cement 18 inside the casing 12.

The need for logging tools or special techniques used to determine when foamed cement 18 has reached the bottom of the well bore 10 is eliminated.

The pressure on the casing 12 can be released after the foamed cement 18 is displaced which reduces the chance of a detrimental micro-annulus forming and insures that foamed cement 18 does not flow back inside the casing 12.

The flow of the foamed cement 18 out of the well bore 10 can be stopped once uncontaminated foamed cement 18 flows back at the surface thus eliminating, or at least minimizing, the amount of waste foamed cement 18 that must be circulated out of the well into a pit or other container.

It is understood that variations may be made in the foregoing without departing from the scope of the invention. Examples of these variations are as follows:

A non-foamed cement can be initially introduced into the annulus 14, followed by the introduction of the foamed cement 18, if higher strength cement is desired and/or if foamed fluids cannot be handled or are not desired at the surface. In this case, the foamed cement 18 in the annulus 14 can still be compressed to allow the displacement of the cement back down inside the casing 12.

The type of wiper plug 20, and the number of wiper blades, can be varied within the scope of the invention.

The term "casing" is meant to cover any type of tubular member, including a conduit, pipe, liner, liner string, etc.

Although the well bore in the illustrative example above was shown and described as being substantially vertical, it is understood that it can deviate from vertical within the scope of the invention. In the latter context, expressions such as "down" and "up," were used for the purpose of illustration only.

Still further, the relative sizes of the various components, as well as the annulus 14 and well bore 10, can be varied within the scope of the invention.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A method of cementing in an annulus formed between a casing and the wall of a well bore, the method comprising the steps of:

forming a foamed cement;

introducing the foamed cement into the upper portion of the annulus for passing downwardly through the annulus;

providing an unencumbered passage through the casing so that the foamed cement passes from the lower portion of the annulus, into the lower portion of the casing, and then towards the upper portion of the casing;

then forcing a plug downwards through the casing to compress the foamed cement in the casing and force it down the casing and out the lower end of the casing and back to the annulus; and latching the plug at the lower end portion of the casing to prevent backflow of the foamed cement into the casing.

2. The method of claim 1 wherein the step of latching causes the pressure on the casing to be released.

3. The method of claim 1 further comprising wiping the inner wall of the casing during the step of forcing.

4. The method of claim 1 wherein the step of foaming comprises mixing a hydraulic cement, sufficient water to form a slurry, and sufficient gas to foam the slurry.

5. The method of claim 1 wherein the foamed cement reverses its flow direction when passing from the annulus to the casing.

6. A method of cementing in an annulus formed between a casing and the wall of a well bore, the method comprising the steps of:

forming a foamed cement;

introducing the foamed cement into the upper portion of the annulus for passing downwardly through the annulus:

providing an unencumbered passage through the casing so that the foamed cement passes from the lower portion of the annulus, into the lower portion of the casing, and then towards the upper portion of the casing;

then forcing a plug downwards through the casing to compress the foamed cement in the casing and force it down the casing and out the lower end of the casing and back to the annulus; and latching the plug at the lower end portion of the casing to prevent backflow of the foamed cement into the casing; and releasing the pressure on the casing after the step of forcing.

7. The method of claim 6 further comprising wiping the inner wall of the casing during the step of forcing.

8. The method of claim 6 wherein the step of foaming comprises mixing a hydraulic cement, sufficient water to form a slurry, and sufficient gas to foam the slurry.

9. The method of claim 6 wherein the foamed cement reverses its flow direction when passing from the annulus to the casing.

* * * * *